(12) United States Patent
Scheibl

(10) Patent No.: US 6,457,866 B1
(45) Date of Patent: Oct. 1, 2002

(54) ROTARY BEARING

(75) Inventor: Lothar Scheibl, Alsdorf (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 8 days.

(21) Appl. No.: 09/669,501

(22) Filed: Sep. 25, 2000

(30) Foreign Application Priority Data

Oct. 23, 1999 (DE) .......................................... 199 51 176

(51) Int. Cl.$^7$ .............................................. F16C 17/03
(52) U.S. Cl. ..................................... 384/104; 384/117
(58) Field of Search ................................. 384/104, 117, 384/119, 114, 312; 33/549; 267/154

(56) References Cited

U.S. PATENT DOCUMENTS 5,542,188 A * 8/1996 Ertl et al. ...................... 33/549
5,549,392 A * 8/1996 Anderson .................... 384/104

FOREIGN PATENT DOCUMENTS

DE        30 20 022 A1      12/1981

* cited by examiner

*Primary Examiner*—Lenard A. Footland
(74) *Attorney, Agent, or Firm*—Welsh & Katz, Ltd.

(57) ABSTRACT

A rotary bearing, in particular for optical measuring technology, such as measuring the image fidelity of an optical element, with an aperture and central axis, is provided with an outer mounting part (1) and with an inner bearing part (2). The inner bearing part (2) is connected to a drive output part (6), which can be rotated with respect to the outer mounting part (1) about the central axis. The outer mounting part (1) and the inner bearing part (2) lie in a common plane and are interconnected by articulated joints. The inner bearing part (2) is divided into a plurality of segments, which are respectively connected to the drive output part (6) via resilient articulated joints.

10 Claims, 1 Drawing Sheet

ROTARY BEARING

DESCRIPTION

The invention relates to a rotary bearing, in particular for optical measuring technology, such as measuring the image fidelity of an optical element.

Rotary bearings are generally used for realizing complete revolutions. For this purpose, rolling-element or sliding bearings are generally used. However, for rotation of an object in small angular increments, for example in 1/10 degree increments or even less, rolling-element or sliding bearings are only suitable with restrictions, or, owing to their shaping, are almost unsuitable. This applies for example to running accuracy, friction and freedom from backlash.

In optical measuring technology, for the testing of optical imaging systems, for example of a lens system, it is often required to compare the latter with a sample copy or an image grating in order to establisb the quality of the unit being tested. In particular in the case of photolithographic processes for producing integrated semiconductor circuits, the optical systems used for this purpose have to meet extremely high accuracy requirements. When testing for distortion, for example of a lens system, a groove grating for example is arranged on the inlet side of the unit being tested and is transilluminated. The light falls through the measuring grating and the lens system, the lens system producing an aerial image of this groove grating. This groove grating is then placed into a physical grating, it being attempted to make the two gratings coincide or congruent. This test may take place, for example, by using interferometric means or by the moire method. For this test, the unit being tested must be rotated correspondingly on its rest. The required rotational movements are, however, generally in the range of 10 millidegrees.

DE 30 20 022 A1 describes a method and a device for testing optical imaging systems in which an original sample is compared with a sample copy produced by the imaging system to be tested. Indications as to how in constructional terms the unit being tested or from it the original grating and grating copy are to be made to coincide are not disclosed in this document.

The present invention is based on the object of providing a rotary bearing of the type mentioned at the beginning which is particularly suitable for rotation in very small angular increments, in particular for optical measuring technology, to be precise in particular with regard to a simple construction, accuracy and low friction.

This object is achieved according to the invention.

The rotary bearing according to the invention represents by virtue of its construction an adjusting unit which manages with few components and, in addition, has great rigidity. The arrangement of the outer mounting part and inner bearing part in one plane with the articulated joints lying in between has the effect that the rotational principle is two-dimensional, while the overall height represents a measure of the rigidity of the bearing in the direction of the axis of rotation. The properties of this bearing are consequently determined by the choice of the geometry and nature of the material. In this way, very great axial rigidity can be achieved, while the tangential rigidity is very low.

According to the invention, the inner bearing part is adjusted with respect to the outer mounting part, which is arranged such that it is fixed. The adjusting movement is passed on via the segments from which the inner bearing part is formed to a drive output part, which is respectively connected to the individual segments via resilient articulated joints, in such a way that a pure rotation of the drive output part is obtained. The optical element to be measured, for example a lens system, is placed onto the drive output part, unless the drive output part is already the optical element to be measured.

If, in a very advantageous refinement of the invention, it is provided that the outer mounting part and the inner bearing part are formed in one piece and are interconnected by solid-state articulated joints, a further component is saved. At the same time, freedom from backlash is obtained in this way. In addition, it is possible to dispense with additives for possible emergency running properties or minimizing friction.

Since, according to the invention, the bearing comprises only solid-state articulated joints with codirectional axes of rotation, interference with other degrees of freedom, i.e. corresponding effects on axes other than the intended axis of rotation, is ruled out. The adjusting range of the bearing is determined by the diameter ratio of the outer mounting part and inner bearing part as well as the elastic properties of the material.

In a very advantageous refinement of the invention, it is provided that each segment of the inner bearing part is connected to the outer mounting part via two articulated joints in each case, in such a way that a parallelogram-like displacement of each segment with respect to the outer mounting part is obtained.

The parallelogram-like displacement of the segments of the inner bearing part with respect to the outer mounting part according to the invention produces for the drive output part, which is connected to the segments via the resilient articulated joints, merely a rotation about the center of the bearing, while the movement of the connected resilient articulated joints compensates for the radial and tangential translation of the segments. In this case, the coupling of the individual inner ring segments may take place via two solid-state articulated joints, the common joining point of which represents the drive output.

The coupling according to the invention with the parallelogram-like displacement has the further advantage that the resulting radial movement of the segments is in a strict mathematical relationship with the rotation produced, so that it can be used as a measuring distance for a measuring sensor for measuring the rotational movement. In addition to the radial movement of the segments in relation to one another, a tangential movement of the segments also arises on the basis of the parallelogram-like displacement, whereby the distances between the individual segments also change.

Advantageous developments emerge from the remaining subclaims and from the exemplary embodiment presented in principle below with reference to the drawing, in which:

Figure 1:
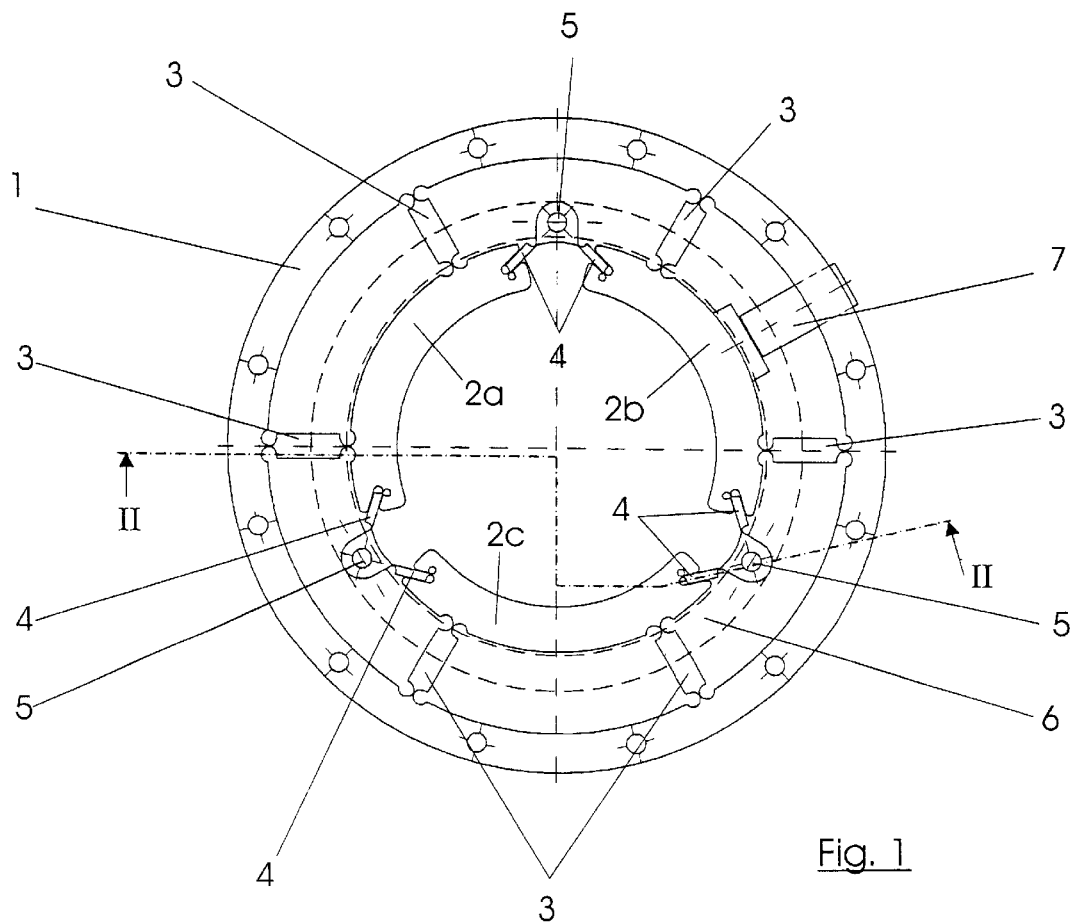
FIG. 1 shows a plan view of the rotary bearing according to the invention.
Figure 2:
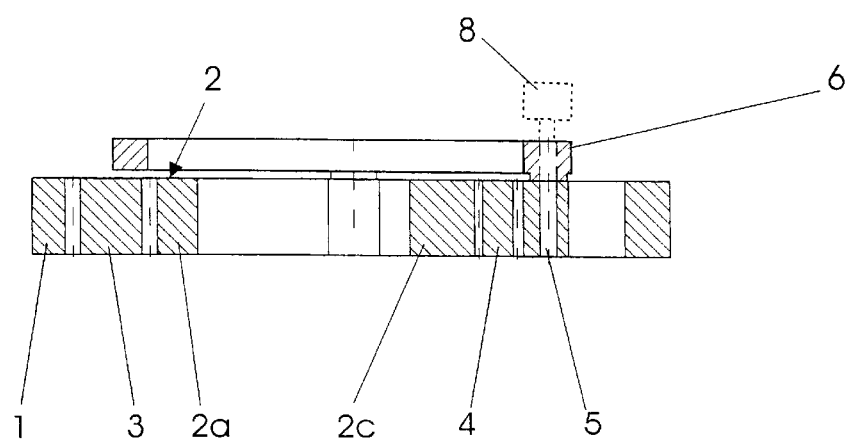
FIG. 2 shows a section along the line II—II of FIG. 1.

The rotary bearing according to FIGS. 1 and 2 has, as the outer mount, an outer ring 1 and, as the inner bearing part, an inner ring 2, which comprises three segments 2a, 2b and 2c.

The outer ring 1 and the segmented inner ring 2 both lie in one plane and are interconnected via articulated joints, which are designed as solid-state articulated joints 3. This means that the outer ring 1 and the segmented inner ring 2 are formed monolithically or in one piece together with the solid-state articulated joints 3, constrictions at both ends of the solid-state articulated joints 3 providing a corresponding elasticity or mobility in a known way.

It can be seen from FIG. 1 that the solid-state articulated joints 3 extend out from the outer ring 1 inward in the form of spokes, each segment 2a, 2b and 2c of the inner ring 2 being connected to the outer ring 1 via two solid-state articulated joints 3 in each case. The solid-state articulated joints 3 are in this case respectively arranged in the region of the ends of the segments 2a, 2b and 2c and in this way establish a parallelogram-like connection of each segment 2a, 2b, 2c with the outer ring 1. The ends of resilient articulated joints 4 act on each of the two circumferential ends of the segments 2a, 2b and 2c. What is respectively the other ends of the resilient articulated joints 4, which may respectively be designed as solid-state articulated joints, are mounted in drive output nodes 5, which are arranged on a drive output part 6.

As can be seen from FIG. 1, in the case of the rotary bearing there is a central axis with a free inner space or aperture inside the inner ring 2.

It can be seen from FIG. 2, which represents a section along the line II—II of FIG. 1, and extends on one side through a solid-state articulated joint 3 and on the other side through a resilient articulated joint 4 and a drive output node 5, that the drive output part 6 is mounted above the plane of the outer ring 1 and of the inner ring 2 and is connected via a total of six resilient articulated joints 4 to the three segments 2a, 2b and 2c of the inner ring 2.

The introduction of the rotational movement or rotation of the inner ring 2, and consequently also of the drive output part 6, with respect to the outer ring 1 takes place by a drive device (not represented in any more detail but indicated by dashed lines in FIG. 2). The drive can in this case be introduced via the drive output nodes 5.

When a rotational movement is introduced via the drive output nodes 5, the three segments 2a, 2b and 2c of the inner ring 2 are displaced in a parallelogram-like manner with respect to the fixed outer ring 1. This means that they perform both a radial movement and a tangential movement with respect to one another. The connection of the three segments 2a, 2b and 2c of the inner ring 2 via the resilient articulated joints 4 to the drive output nodes 5, and consequently also to the drive output part 6, has the effect that the drive output part 6 merely performs a rotation about the center of the bearing, the movement of the connected resilient articulated joints 4 compensating for the radial and tangential translation of the segments.

The object to be measured, such as a lens system for example, can be placed onto the drive output part 6. It is also possible, however, that the drive output part 6 already represents the optical element to be measured.

Since the radial movement occurring during the rotation of the bearing on the segments 2a, 2b and 2c of the inner ring 2 is in a strict mathematical relationship with the rotation produced, the radial movement can be used as a measuring distance for the path of rotation. For this purpose, a measuring sensor 7 for example may be provided, measuring for example the radial path of the segment 2b. Various known measuring sensors are suitable for this purpose, such as for example a capacitive pickup, which has a very high degree of accuracy or a very high resolution and consequently allows a very precise measurement, even of extremely small angles of rotation.

On account of the monolithic type of construction of the mounting ring 1, solid-state articulated joints 3 and inner ring 2, there is no backlash during rotation and no friction. In addition, great rigidity can be achieved, determined by the overall height. At the same time, this type of construction provides a system-immanent or defined zero point for the rotation.

Instead of introducing the drive via the drive output nodes 5, there are of course other possibilities within the scope of the invention for bringing about a rotation of the drive output part 6 with respect to the outer ring 1. One further possibility would be, for example, via the resilient articulated joints 4, if they are of a corresponding construction.

What is claimed is:

1. A bearing for optical measuring technology with an outer mounting and with an inner bearing, said inner bearing being connected to a drive output, which can be rotated with respect to said outer mounting about a central axis in small angular increments, said outer mounting and said inner bearing lying in a common plane and being interconnected by first articulated joints, and said bearing being divided into a plurality of independent segments, which are respectively connected to said drive output by second resilient articulated joints and are solid.

2. The bearing as claimed in claim 1, wherein each segment has two circumferential segment ends and is connected at said ends to one end and of an associated second resilient articulated joint, while the other end of the second resilient articulated joint is articulated at a drive output node, at which the end of the resilient articulated joint lying adjacent thereto is articulated.

3. The bearing as claimed in claim 2, wherein the drive output nodes are provided with a drive device for introducing a rotational movement for the drive output.

4. The bearing as claimed in claim 1, wherein the drive output is the optical element to be measured.

5. The bearing as claimed in claim 1, wherein said outer mounting and said inner bearing are formed in one piece and said first articulated joints are solid state.

6. The bearing as claimed in claim 1, wherein each segment of said inner bearing is connected to said outer mounting via two articulated joints in each case, in such a way that a parallelogram-like displacement of each segment with respect to said outer a mounting is obtained.

7. The bearing as claimed in claim 6, wherein at least one of the segments of the inner bearing is provided with a measuring sensor for measuring the rotational movement.

8. The bearing as claimed in claim 7, wherein a measuring sensor is provided to measure the radial movement of a segment of the inner bearing induced by the rotation.

9. The bearing as claimed in claim 8, wherein the measuring sensor is a capacitive pickup.

10. A bearing for optical measuring technology for measuring the image fidelity of an optical element with an aperture and central axis, with an outer mounting and with an inner bearing, said inner bearing being connected to a drive output, which can be rotated with respect to said outer mounting about the central axis within small angular increments, said outer mounting and said inner bearing lying in a common plane and being interconnected by first articulated joints, and said bearing being divided into a plurality of independent segments, which are respectively connected to said drive output by second resilient articulated joints wherein each segment of the inner bearing is connected to said outer mounting via two articulated joints in each case, so that a displacement of each segment with respect to said outer mounting is obtained in the form of a parallelogram.

* * * * *